(12) United States Patent
Yonekura

(10) Patent No.: US 12,158,456 B2
(45) Date of Patent: Dec. 3, 2024

(54) LIQUID CHROMATOGRAPH INCLUDING SPECTROSCOPIC ANALYSIS UNITS

(71) Applicant: SHIMADZU CORPORATION, Kyoto (JP)

(72) Inventor: Takuya Yonekura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 403 days.

(21) Appl. No.: 17/431,762

(22) PCT Filed: Sep. 19, 2019

(86) PCT No.: PCT/JP2019/036792
§ 371 (c)(1),
(2) Date: Aug. 18, 2021

(87) PCT Pub. No.: WO2020/183763
PCT Pub. Date: Sep. 17, 2020

(65) Prior Publication Data
US 2022/0146469 A1 May 12, 2022

(30) Foreign Application Priority Data
Mar. 13, 2019 (JP) ................................. 2019-045551

(51) Int. Cl.
*G01N 30/86* (2006.01)
*G01N 30/02* (2006.01)
*G01N 30/74* (2006.01)

(52) U.S. Cl.
CPC ......... *G01N 30/8665* (2013.01); *G01N 30/74* (2013.01); *G01N 30/8631* (2013.01); *G01N 30/8651* (2013.01); *G01N 2030/027* (2013.01)

(58) Field of Classification Search
CPC ............... G01N 30/74; G01N 30/8631; G01N 30/8651; G01N 2030/027; G01N 30/86; G01N 30/8665
See application file for complete search history.

(56) References Cited

U.S. PATENT DOCUMENTS 6,449,040 B1 * 9/2002 Fujita ..................... G01N 21/03
356/326
2014/0041059 A1 2/2014 Tsujii

FOREIGN PATENT DOCUMENTS

JP      2-181649 A    7/1990
JP      2000-146831 A 5/2000
(Continued)

OTHER PUBLICATIONS

International Search Report for corresponding Application No. PCT/JP2019/036792, mailed Dec. 17, 2019.
(Continued)

*Primary Examiner* — Eric S. McCall
*Assistant Examiner* — Timothy P Graves
(74) *Attorney, Agent, or Firm* — Renner, Otto, Boisselle & Sklar, LLP

(57) ABSTRACT

A liquid chromatograph including a spectroscopic analysis unit (40) that performs spectroscopic analysis by irradiating a flow cell (90) through which an eluent eluted from a column (31) flows with light is provided with a cell information reading unit (49) that is provided in the spectroscopic analysis unit and accesses a storage device (91) attached to the flow cell to acquire cell information that is information unique to a type or an individual of the flow cell; a wavelength check control unit (51) that causes the spectroscopic analysis unit to execute wavelength check; a wavelength check information storage unit (53) in which a result of the wavelength check is stored in association with the cell information acquired at a time of executing the wavelength (Continued)

check; and a system check report creation unit (74) that creates a system check report in which the result of the wavelength check and the cell information acquired at the time of executing the wavelength check are described by referring to the wavelength check information storage unit. This makes it possible to sufficiently secure the reliability of the analysis result.

4 Claims, 3 Drawing Sheets

(56) References Cited

FOREIGN PATENT DOCUMENTS

| JP | 2009-31177 A | | 2/2009 | |
|---|---|---|---|---|
| JP | 2009031177 A | * | 2/2009 | ............. G01N 21/17 |
| JP | 2014-29282 A | | 2/2014 | |

OTHER PUBLICATIONS

Written Opinion for corresponding Application No. PCT/JP2019/036792, mailed Dec. 17, 2019.
Office Action for corresponding CN Application No. 201980090388.X issued May 11, 2023, with English language machine translation.
Office Action for corresponding JP Application No. 2021-505490 dated Feb. 8, 2021, with English language machine translation.
Office Action for corresponding CN Application No. 201980090388.X issued Oct. 17, 2022, with English language machine translation.

* cited by examiner

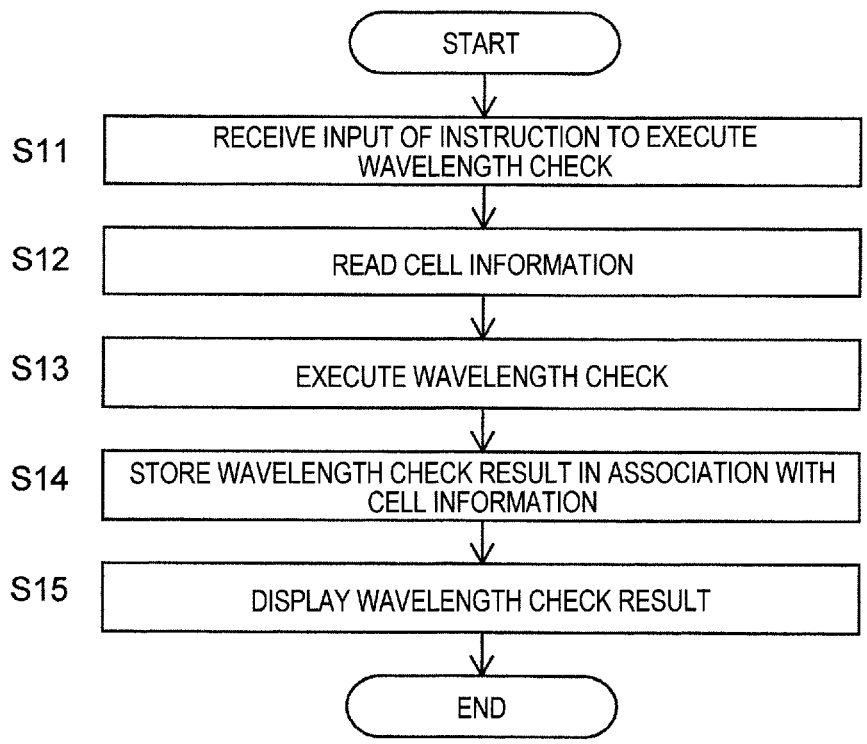
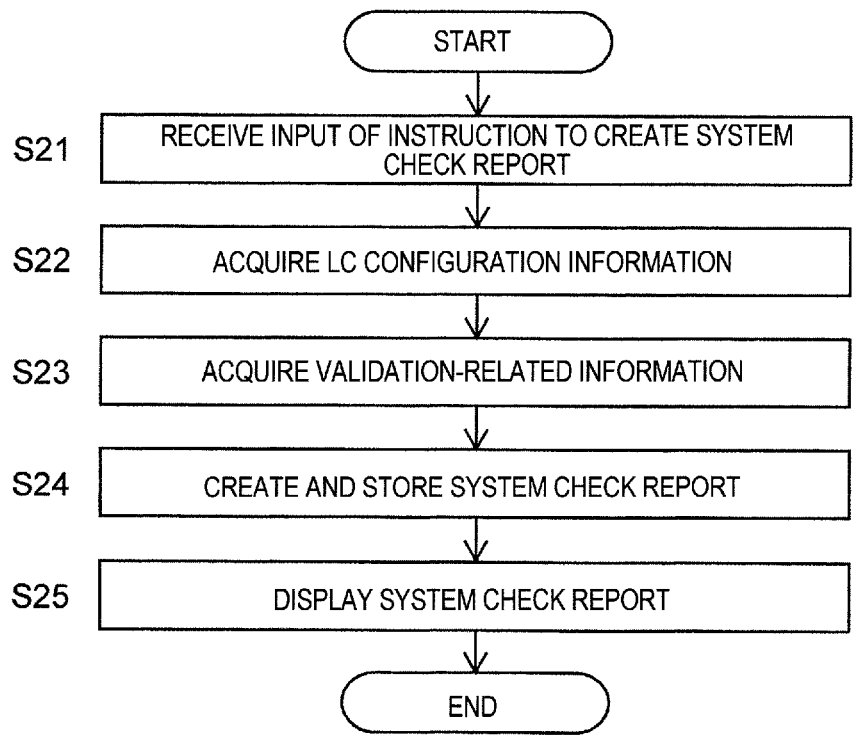

LIQUID CHROMATOGRAPH INCLUDING SPECTROSCOPIC ANALYSIS UNITS

TECHNICAL FIELD

The present invention relates to a liquid chromatograph.

BACKGROUND ART

In a liquid chromatograph, a spectrophotometer is widely used as a detector for detecting a sample component eluted from a column. Such a detector includes, for example, a flow cell, a spectroscopic element, a photodiode array, and the like, and an eluent from the column is sequentially introduced into the flow cell and light from a light source is irradiated to the flow cell. The light (transmitted light, fluorescence, scattered light, and the like) after the interaction with the eluent in the flow cell is wavelength-separated by the spectroscopic element and then incident on the photodiode array and detected, and the light amount for each wavelength is measured.

Meanwhile, in an analyzer such as a liquid chromatograph, in order to ensure reliability of an analysis result by the analyzer, it is required to periodically (for example, once a week or the like) inspect (validate) whether or not the analyzer is functioning normally, whether or not basic performance satisfies a standard, or the like and record the result (see, for example, Patent Literature 1 or the like).

For example, in the liquid chromatograph including the spectrophotometer as described above, wavelength check (that is, validation of wavelength accuracy) of the spectrophotometer is performed as one of the inspection items in the validation. In the wavelength check, the flow cell is irradiated with light from the light source (for example, a deuterium lamp or a halogen lamp) having an emission line at a known wavelength, and a spectrum in which the wavelength is taken on the horizontal axis and the received light intensity is taken on the vertical axis is created based on the detection result in the photodiode array at that time. Then, an error between a set wavelength and a true wavelength is calculated by comparing a peak position of a bright line (the emission line) on the spectrum with a true wavelength value (theoretical value) of the bright line. This error represents the accuracy of the wavelength in the detector of the liquid chromatograph.

CITATION LIST

Patent Literature

Patent Literature 1: JP 2014-29282 A

SUMMARY OF INVENTION

Technical Problem

However, there are various types of flow cells used in the detector of the liquid chromatograph as described above, such as a standard cell, a micro cell, a semi-micro cell, a high-pressure cell, a high-speed cell, and a sorting cell, and the result of the wavelength check varies depending on the type of the flow cell used.

For this reason, there is no problem when only one type of flow cell (for example, a standard cell) is used in one liquid chromatograph, but when a plurality of types of flow cells are alternately used, it is sometimes difficult to know which cell is used for the periodic wavelength check, and there is a possibility that the reliability of the analysis result by the liquid chromatograph cannot be secured.

The present invention has been made in view of the above point, and an object thereof is to provide a liquid chromatograph capable of sufficiently securing reliability of an analysis result.

Solution to Problem

A liquid chromatograph according to the present invention made to solve the above problem includes:
a spectroscopic analysis unit configured to perform spectroscopic analysis by irradiating a flow cell through which an eluent eluted from a column flows with light;
a cell information reading unit that is provided in the spectroscopic analysis unit and configured to access a storage device attached to the flow cell to acquire cell information that is information unique to a type or an individual of the flow cell;
a wavelength check control unit configured to cause the spectroscopic analysis unit to execute wavelength check;
a wavelength check information storage unit in which a result of the wavelength check is stored in association with the cell information acquired at a time of executing the wavelength check; and
a system check report creation unit configured to create a system check report including the result of the wavelength check and the cell information acquired at the time of executing the wavelength check by referring to the wavelength check information storage unit.

Advantageous Effects of Invention

According to the present invention, it is possible to provide the liquid chromatograph capable of sufficiently securing the reliability of the analysis result.

BRIEF DESCRIPTION OF DRAWINGS

FIG. 2 is a flowchart illustrating an operation at the time of executing wavelength check in the liquid chromatograph.

FIG. 3 is a flowchart illustrating an operation at the time of creating a system check report in the liquid chromatograph.

DESCRIPTION OF EMBODIMENTS

Figure 1:
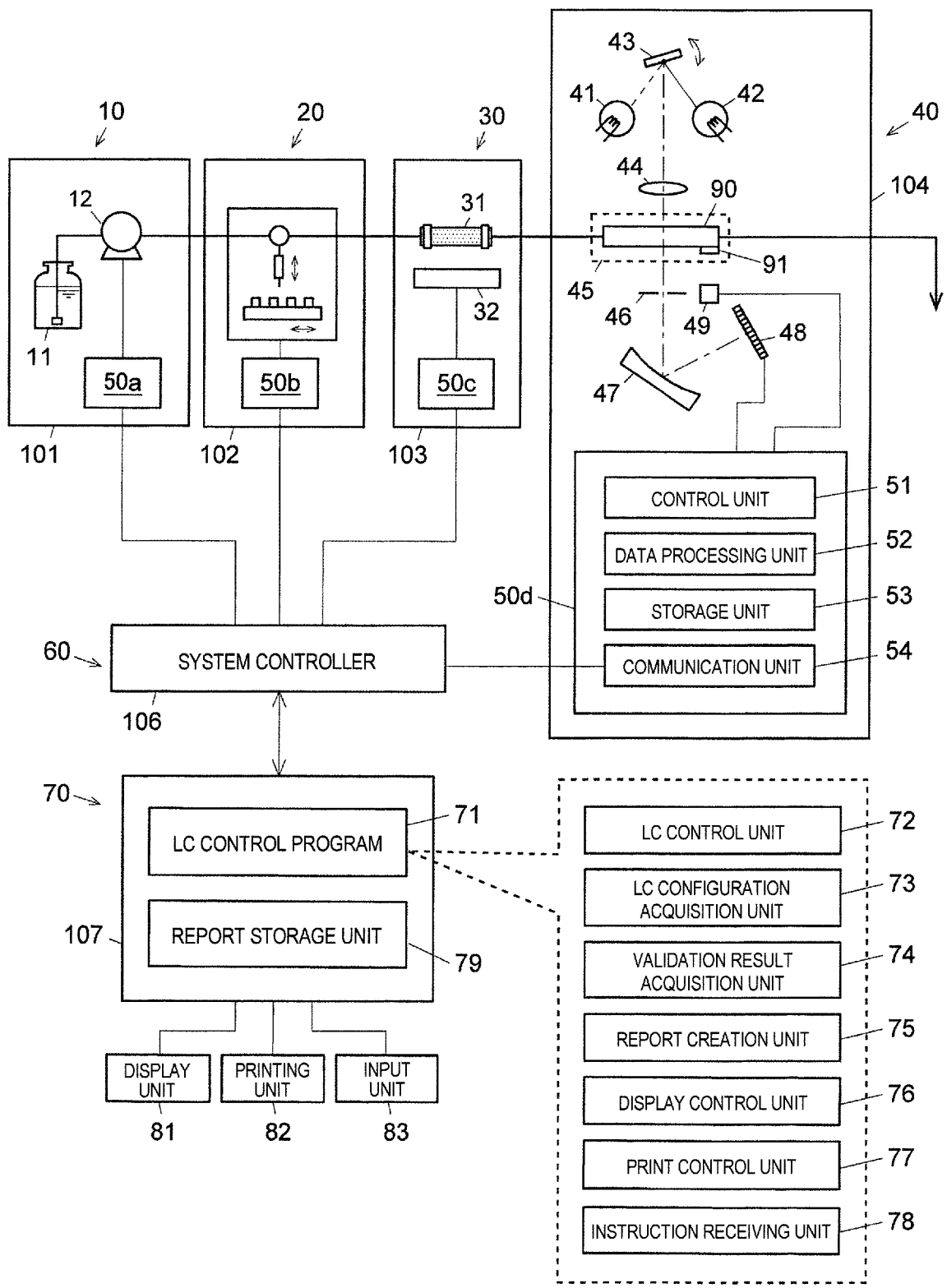
FIG. 1 is a schematic configuration diagram illustrating an embodiment of a liquid chromatograph according to the present invention.

Hereinafter, embodiments of the present invention will be described with reference to the drawings. FIG. 1 is a configuration diagram of a main part of a liquid chromatograph according to the present embodiment. The liquid chromatograph includes, as operation units, a liquid supply unit 10 (corresponding to a liquid supply unit in the present invention), an autosampler 20 (corresponding to a sample injection unit in the present invention), a column oven 30, and a detector unit 40 (corresponding to a spectroscopic analysis unit in the present invention), and includes a system controller 60 that is connected to these operation units and integrally controls an operation of each operation unit, and an external computer 70 that is connected to the system controller 60 and processes data acquired by the detector unit 40 and inputs a user's instruction. The system controller 60 and the external computer 70 correspond to an integrated control unit in the present invention. The liquid supply unit 10, the autosampler 20, the column oven 30, the detector unit 40, the system controller 60, and the external computer 70 have respective housings 101, 102, 103, 104, 106, and 107, independent from each other.

The liquid supply unit 10 accommodates a mobile phase container 11 that stores a mobile phase (eluent), and includes a liquid supply pump 12 that sucks the mobile phase from the mobile phase container 11 and supplies the mobile phase at a constant flow rate. The autosampler 20 selects one liquid sample from a plurality of preset liquid samples and injects the selected liquid sample into the mobile phase fed from the liquid supply pump 12. The column oven 30 accommodates a column 31 for separating components in the sample injected into the mobile phase, and includes a heater 32 for controlling the temperature of the column 31.

The detector unit 40 includes a spectrophotometer, and includes a deuterium lamp 41, a tungsten lamp 42, a light source switching mirror 43, a lens 44, a cell mounting portion 45, a slit 46, a diffraction grating 47, and a photodiode array 48. The deuterium lamp 41 mainly generates light having a wavelength in the ultraviolet range, and the tungsten lamp 42 mainly generates light having a wavelength in the visible range. The light source switching mirror 43 reflects light from the deuterium lamp 41 or the tungsten lamp 42 (hereinafter simply referred to as "light from a light source") and sends the light alternatively to the lens 44. The lens 44 condenses the light from the light source on a flow cell 90 mounted on the cell mounting portion 45. The sample introduced together with the mobile phase from the column 31 passes through the flow cell 90, and the light from the light source is transmitted through the flow cell. At this time, in the flow cell 90, the sample is irradiated with light from the light source, and light having a wavelength determined by a component of the sample is absorbed. The light having passed through the flow cell 90 passes through the slit 46 and is then wavelength-dispersed by the diffraction grating 47. The photodiode array 48 is formed by arranging a large number of detection elements in a one-dimensional array, and detects light having a specific wavelength among light wavelength-dispersed by the diffraction grating 47 for each detection element. In this way, in the photodiode array 48, the detection intensity for each wavelength is obtained.

A radio tag 91 (corresponding to a storage device in the present invention) including a nonvolatile memory in which information of the flow cell 90 (hereinafter referred to as "cell information") is recorded is attached to the flow cell 90 used in the present embodiment, and a cell information reading unit 49 for reading recorded contents of the radio tag 91 by near field communication is disposed in the vicinity of the cell mounting portion 45 inside the detector unit 40. The cell information includes a character string indicating the type of the flow cell 90 (such as a standard cell, a micro cell, a semi-micro cell, a sorting cell, or a high-pressure cell), a character string (for example, the serial number) unique to each individual of the flow cell 90, or both. As the radio tag 91, a non-contact IC tag such as a so-called radio frequency identification (RFID) can be used.

The detector unit 40 further includes a microcontroller 50d including a CPU, a memory, an input/output circuit for communicating with external peripheral devices, and the like. The microcomputer 50d includes, as functional blocks, a control unit 51 (corresponding to a wavelength check control unit in the present invention) that controls the operation of each unit, a data processing unit 52 that processes data acquired by the photodiode array 48 or the cell information reading unit 49, a storage unit 53 (corresponding to a wavelength check information storage unit in the present invention) that stores data processed by the data processing unit 52, and a communication unit 54 that performs communication with the system controller 60. These functional blocks are realized by a processor of the microcomputer 50d executing a program mounted on the microcomputer 50d.

The operation units other than the detector unit 40 also include microcomputers 50a, 50b, and 50c, respectively, and these microcomputers 50a, 50b, and 50c realize functions such as operation control of each operation unit, processing and storage of data acquired by each operation unit, and communication between each operation unit and the system controller 60.

The entity of the external computer 70 is a general-purpose computer such as a personal computer. The external computer 70 includes a mass storage device including a hard disk drive, a flash memory, or the like, and a dedicated program for causing each operation unit to execute analysis by the liquid chromatograph (hereinafter referred to as an "LC control program 71") is installed in the mass storage device. FIG. 1 illustrates an LC control unit 72, an LC configuration acquisition unit 73, a validation result acquisition unit 74, a report creation unit 75 (corresponding to a system check report creation unit in the present invention), a display control unit 76, a print control unit 77, and an instruction receiving unit 78 in relation to the LC control program 71. These are all functional blocks realized by software when a processor of the external computer 70 executes the LC control program 71 (details of each functional block will be described later). The mass storage device of the external computer 70 is further provided with a report storage unit 79 that stores a system check report created by the report creation unit 75 (details will be described later). Furthermore, a display unit 81 including a display device such as a liquid crystal display, a printing unit 82 including a printer, and an input unit 83 including a keyboard, a mouse, and the like are connected to the external computer 70.

The system controller 60 is interposed between the external computer 70 and each operation unit to transmit and receive a command or data, and includes a microcomputer (not illustrated) including a CPU, a memory, an input/output circuit for communicating with an external peripheral device, and the like. A program for controlling the operation of each operation unit according to an instruction from the external computer 70 and acquiring information from each operation unit is installed in the microcomputer.

Hereinafter, an operation when wavelength check of the detector unit 40 is performed in the liquid chromatograph of the present embodiment will be described with reference to the flowchart of FIG. 2. The following steps are executed in a state where the flow cell 90 is mounted to the cell mounting portion 45 of the detector unit 40 and a predetermined liquid (for example, water) is accommodated in the flow cell 90.

First, when a user gives an instruction to execute the wavelength check in the detector unit 40 by performing a predetermined operation on the input unit 83, the instruction is received by the instruction receiving unit 78 (step S11). The instruction is transmitted to the LC control unit 72, whereby the LC control unit 72 generates a command instructing execution of the wavelength check and transmits the command to the system controller 60. The command is transmitted to the communication unit 54 of the detector unit 40 via the system controller 60.

In the detector unit 40 that has received the command, first, the cell information reading unit 49 accesses the radio tag 91 attached to the flow cell 90 to acquire the cell information of the flow cell 90 (step S12), and then, the wavelength check is executed under the control of the control unit 51 (step S13). The acquisition of the cell information (step S12) and the wavelength check (step S13) may be performed in reverse order. Alternatively, the cell information may be acquired during the execution of the wavelength check.

In the wavelength check in step S13, first, in a state in which the light from the deuterium lamp 41 is made incident on the flow cell 90 by the light source switching mirror 43, the light having passed through the flow cell 90 and been dispersed by the diffraction grating 47 is detected by the photodiode array 48. Then, based on the detection signal from the photodiode array 48 at this time, the data processing unit 52 creates a spectrum in which the wavelength is taken on the horizontal axis and the received light intensity is taken on the vertical axis.

Thereafter, the direction of the light source switching mirror 43 is switched to cause the light from the tungsten lamp 42 to be incident on the flow cell 90, and a spectrum similar to the above is created based on the detection signal from the photodiode array 48 at this time. The light from the deuterium lamp 41 and the light from the tungsten lamp 42 may be applied to the flow cell 90 in the reverse order to the above.

Subsequently, a wavelength at the peak position of each bright line (hereinafter, this is referred to as a "measured value of a bright line wavelength") in each of the spectra obtained as described above is specified, and the measured value of the bright line wavelength is compared with a theoretical value of the wavelength of the bright line stored in advance in the storage unit 53. Further, an error between the measured value and the theoretical value of the bright line is calculated, and it is determined whether the error is equal to or smaller than a predetermined threshold value for each bright line. At this time, when the error is equal to or smaller than the threshold value, it is determined that the wavelength accuracy related to the bright line is passed, and when the error is equal to or larger than the threshold value, it is determined that the wavelength accuracy related to the bright line is failed.

The wavelength check result (that is, the measured value of each bright line, the error between the measured value and the theoretical value of each bright line, and whether each bright line is passed or failed) obtained as described above is stored in the storage unit 53 of the detector unit 40 in association with the cell information read in step S12 (step S14). In addition, the wavelength check result is transmitted to the external computer 70 via the system controller 60 and displayed on the screen of the display unit 81 under the control of the display control unit 76 (step S15).

Next, an operation at the time of creating the system check report in the liquid chromatograph of the present embodiment will be described with reference to the flowchart of FIG. 3. The system check report is created for the user to check and record the state of the liquid chromatograph at that time on a regular basis (for example, once a day) or non-regular basis (for example, before sample analysis by the liquid chromatograph of the present embodiment is performed, or when components constituting the liquid chromatograph are replaced).

First, when the user gives an instruction to create a system check report by performing a predetermined operation on the input unit 83, the instruction is received by the instruction receiving unit 78 (step S21), and transmitted to the LC configuration acquisition unit 73 and the validation result acquisition unit 74. The LC configuration acquisition unit 73 that has received the instruction from the instruction receiving unit 78 acquires information (hereinafter referred to as "LC configuration information") on the current configuration of the liquid chromatograph by controlling each operation unit through the system controller 60 (step S22). Further, the validation result acquisition unit 74 that has received the instruction from the instruction receiving unit 78 acquires information on validation (hereinafter referred to as "validation-related information") in each operation unit by controlling each operation unit via the system controller 60 (step S23). Steps S22 and S23 may be performed in reverse order.

The LC configuration information is information for identifying a type or an individual of each operation unit constituting the liquid chromatograph and information for identifying a type or an individual of a component included in each operation unit, and specifically includes a number or a code (for example, a product name, a model number, or a production number (serial number)) unique to each type or individual of each operation unit and each component. The LC configuration information also includes the cell information of the flow cell 90 currently mounted to the detector unit 40. That is, in step S22 described above, the cell information is read by the cell information reading unit 49 of the detector unit 40 according to an instruction from the LC control unit 72, and the cell information is transmitted to the external computer 70 via the system controller 60.

In addition, the validation-related information is information on a date and time, a condition, and a result of validation most recently performed in each operation unit. The validation-related information is stored in the microcomputers 50a, 50b, 50c, and 50d of the respective operation units in consideration of the possibility that the unit configuration of the liquid chromatograph changes (that is, any operation unit is replaced).

Subsequently, the report creation unit 75 creates a system check report based on the LC configuration information acquired in step S22 and the validation-related information acquired in step S23 (step S24). The created system check report is stored in the report storage unit 79 and displayed on the screen of the display unit 81 under the control of the display control unit 76 (step S25).

Figure 4:
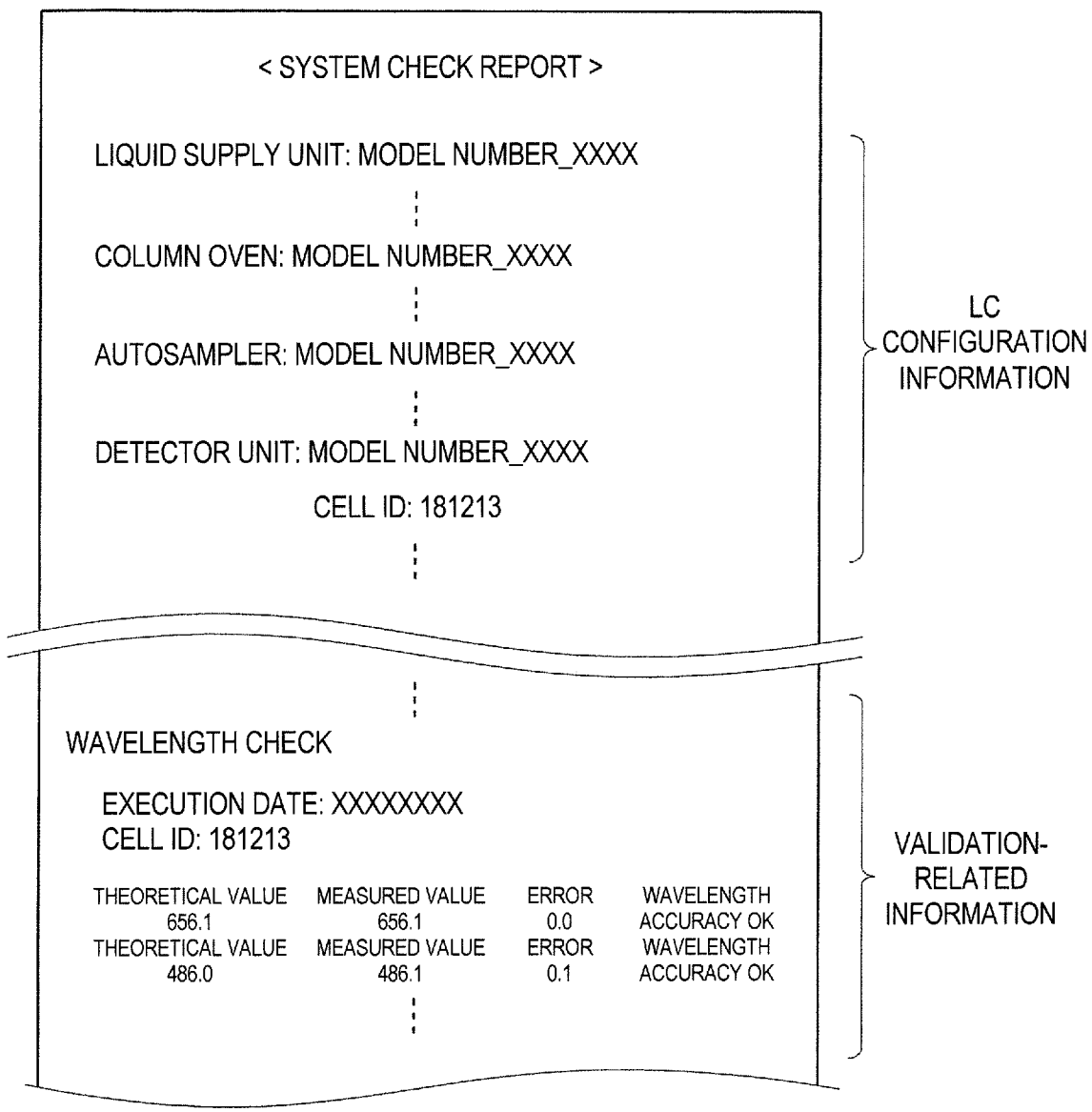
FIG. 4 is a schematic diagram illustrating an example of a system report in the present embodiment.

An example of the system check report is illustrated in FIG. 4. In this system check report, the LC configuration information (information acquired in step S22) is described at the beginning, and the LC configuration information also includes the cell information (denoted as "cell ID" in the drawing) of the flow cell 90 currently mounted to the detector unit 40. Further, after the LC configuration information, the validation-related information (information acquired in step S23) for each operation unit is described. Among them, the validation-related information in the detector unit 40 includes at least information on the wavelength check. As the information on the wavelength check, in addition to the wavelength check result (that is, the measured value of each bright line, the error between the measured value and the theoretical value of each bright line, and whether each bright line is passed or failed), the cell information stored in the storage unit 53 of the detector unit 40 in association with the wavelength check result, that is, the cell information of the flow cell 90 mounted to the detector unit 40 at the time of executing the wavelength check (denoted as "cell ID" in the drawing) is described. The cell information described in the system check report may be a character string indicating the type of the flow cell 90, a character string unique to each individual of the flow cell 90, or both.

The user can give an instruction to print the system check report by performing a predetermined operation from the input unit 83. As a result, the printing unit 82 prints the system check report under the control of the print control unit 77.

As described above, according to the liquid chromatograph of the present embodiment, since the cell information of the flow cell 90 used for the wavelength check of the detector unit 40 is described in the system check report together with the result of the wavelength check, it is possible to clearly specify which flow cell 90 is used for the wavelength check. In addition, in the system check report, in addition to the cell information of the flow cell 90 used for the wavelength check, the cell information of the flow cell 90 currently mounted to the detector unit 40 is also described, and thus, it is possible to confirm whether or not the flow cell 90 to be used for analysis of the sample (or already used for the analysis of the sample) is the same type (or the same individual) as the flow cell 90 used for the wavelength check by comparing the two. As a result, according to the liquid chromatograph of the present embodiment, it is possible to sufficiently secure the reliability of the analysis result using the liquid chromatograph.

[Aspects]

It is understood by those skilled in the art that the plurality of exemplary embodiments described above are specific examples of the following aspects.

(First Aspect)

A liquid chromatograph according to a first aspect of the present invention includes:
- a spectroscopic analysis unit configured to perform spectroscopic analysis by irradiating a flow cell through which an eluent eluted from a column flows with light;
- a cell information reading unit that is provided in the spectroscopic analysis unit and configured to access a storage device attached to the flow cell to acquire cell information that is information unique to a type or an individual of the flow cell;
- a wavelength check control unit configured to cause the spectroscopic analysis unit to execute wavelength check;
- a wavelength check information storage unit in which a result of the wavelength check is stored in association with the cell information acquired at a time of executing the wavelength check; and
- a system check report creation unit configured to create a system check report in which the result of the wavelength check and the cell information acquired at the time of executing the wavelength check are described by referring to the wavelength check information storage unit.

The "time of executing the wavelength check" is not limited to the time during the execution of the wavelength check, and may be a time immediately before or immediately after the execution of the wavelength check. In addition, as the spectroscopic analysis, the spectroscopic analysis unit may measure transmittance or absorbance by detecting light passing through the flow cell, or may measure fluorescence or scattered light emitted from the flow cell by irradiation with the light.

In the liquid chromatograph of the first aspect, since the cell information of the flow cell used for the wavelength check of the detector unit is described in the system check report together with the result of the wavelength check, it is possible to clearly specify which flow cell is used for the wavelength check. Therefore, according to the liquid chromatograph of the first aspect, it is possible to sufficiently secure the reliability of the analysis result using the liquid chromatograph.

(Second Aspect)

A liquid chromatograph according to a second aspect of the present invention further includes, in the liquid chromatograph of the above-mentioned first aspect:
- a liquid supply unit configured to supply a mobile phase;
- a sample injection unit configured to inject a sample solution into the mobile phase that has been sent;
- a column oven configured to control a temperature of a column that separates components in the sample solution; and
- an integrated control unit configured to integrally control the liquid supply unit, the sample injection unit, the column oven, and the spectroscopic analysis unit,
- in which the liquid supply unit, the sample injection unit, the column oven, the spectroscopic analysis unit, and the integrated control unit have respective housings independent from each other,
- in which the wavelength check information storage unit is provided in the spectroscopic analysis unit, and
- in which the system check report creation unit is provided in the integrated control unit.

The liquid chromatograph according to the second aspect of the present invention is a unit type liquid chromatograph formed by combining a plurality of operation units each having an independent housing, and since the wavelength check information storage unit is provided in the spectroscopic analysis unit (that is, in the housing of the spectroscopic analysis unit), even when the operation units are rearranged, the spectroscopic analysis unit and the wavelength check information (wavelength check result and cell information) related to the spectroscopic analysis unit can be reliably associated with each other.

(Third Aspect)

In a liquid chromatograph according to a third aspect of the present invention, in the liquid chromatograph of the above-mentioned first or second aspect, the integrated control unit further includes an instruction receiving unit configured to receive an instruction from a user to create the system check report, and
the system check report creation unit is configured to further describe, in the system check report, the cell information read by the cell information reading unit at a time when the instruction receiving unit receives the instruction to create the system check report.

In the liquid chromatograph of the third aspect, in addition to the cell information of the flow cell used for the wavelength check, the cell information of the flow cell currently mounted to the detector unit is also described in the system check report, and thus, it is possible to confirm whether or not the flow cell to be used for analysis of the sample (or already used for the analysis of the sample) is the same type (or the same individual) as the flow cell used for the wavelength check by comparing the two.

REFERENCE SIGNS LIST

10 . . . Liquid Supply Unit
11 . . . Mobile Phase Container
12 . . . Liquid Supply Pump
20 . . . Autosampler
30 . . . Column Oven
31 . . . Column 32 . . . Heater
40 . . . Detector Unit
41 . . . Deuterium Lamp
42 . . . Tungsten Lamp
43 . . . Light Source Switching Mirror
44 . . . Lens
45 . . . Cell Mounting Portion
46 . . . Slit
47 . . . Diffraction Grating
48 . . . Photodiode Array
49 . . . Cell Information Reading Unit
50a to 50d . . . Microcomputer
51 . . . Control Unit
52 . . . Data Processing Unit
53 . . . Storage Unit
54 . . . Communication Unit
60 . . . System Controller
70 . . . External Computer
71 . . . LC Control Program
72 . . . LC Control Unit
73 . . . LC Configuration Acquisition Unit
74 . . . Validation Result Acquisition Unit
75 . . . Report Creation Unit
76 . . . Display Control Unit
77 . . . Print Control Unit
78 . . . Instruction Receiving Unit
79 . . . Report Storage Unit
81 . . . Display Unit
82 . . . Printing Unit
83 . . . Input Unit
90 . . . Flow Cell
91 . . . Radio Tag

The invention claimed is:

1. A liquid chromatograph comprising:
a spectroscopic analysis unit configured to perform spectroscopic analysis by irradiating a flow cell through which an eluent eluted from a column flows with light;
a cell information reading unit that is provided in the spectroscopic analysis unit and configured to access a storage device attached to the flow cell to acquire cell information that is information unique to a type of flow cell or an individual of the flow cell;
an instruction receiving unit configured to receive a user's instruction to execute a wavelength check;
the instruction receiving unit configured to receive a user's instruction to create a system check report;
a wavelength check control unit configured to cause the spectroscopic analysis unit to execute wavelength check in response to the instruction receiving unit receiving the user's instruction to execute a wavelength check;
a wavelength check information storage unit in which a result of the wavelength check is stored in association with the cell information acquired at a time of executing the wavelength check; and
a system check report creation unit configured to create a system check report in which the result of the wavelength check and the cell information acquired at the time of executing the wavelength check are described by referring to the wavelength check information storage unit in response to the instruction receiving unit receiving the user's instruction to create a system check report.

2. The liquid chromatograph according to claim 1, further comprising:
a liquid supply unit configured to supply a mobile phase;
a sample injection unit configured to inject a sample solution into the mobile phase that has been sent;
a column oven configured to control a temperature of a column that separates components in the sample solution; and
an integrated control unit configured to integrally control the liquid supply unit, the sample injection unit, the column oven, and the spectroscopic analysis unit,
wherein the liquid supply unit, the sample injection unit, the column oven, the spectroscopic analysis unit, and the integrated control unit have respective housings independent from each other,
wherein the wavelength check information storage unit is provided in the spectroscopic analysis unit, and
wherein the system check report creation unit is provided in the integrated control unit.

3. The liquid chromatograph according to claim 2,
wherein the integrated control unit further includes an instruction receiving unit configured to receive an instruction to create the system check report from a user, and
wherein the system check report creation unit is configured to further describe, in the system check report, the cell information read by the cell information reading unit at a time when the instruction receiving unit receives the instruction to create the system check report.

4. The liquid chromatograph according to claim 1, wherein the wavelength check which is executed is independent of the type of flow cell or individual flow cell associated with the cell information.

* * * * *